United States Patent
Perdices-Gonzalez

(10) Patent No.: US 10,877,554 B2
(45) Date of Patent: Dec. 29, 2020

(54) HIGH EFFICIENCY INPUT APPARATUS AND METHOD FOR VIRTUAL REALITY AND AUGMENTED REALITY

(71) Applicant: Samsung Electronics Co., Ltd., Suwon-si (KR)

(72) Inventor: Sergio Perdices-Gonzalez, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 35 days.

(21) Appl. No.: 16/125,170

(22) Filed: Sep. 7, 2018

(65) Prior Publication Data

US 2019/0324525 A1     Oct. 24, 2019

Related U.S. Application Data

(60) Provisional application No. 62/660,150, filed on Apr. 19, 2018.

(51) Int. Cl.
    *G06F 3/01*     (2006.01)
    *G06F 3/0346*     (2013.01)
    (Continued)

(52) U.S. Cl.
    CPC .......... *G06F 3/011* (2013.01); *G02B 27/0172* (2013.01); *G06F 3/017* (2013.01);
    (Continued)

(58) Field of Classification Search
None
See application file for complete search history.

(56) References Cited

U.S. PATENT DOCUMENTS

| | | |
|---|---|---|
| 9,858,720 B2 | 1/2018 | da Veiga et al. |
| 9,927,869 B2 | 3/2018 | Kwon et al. |
| | (Continued) | |

FOREIGN PATENT DOCUMENTS

| | | |
|---|---|---|
| EP | 2693255 A1 | 2/2014 |
| EP | 3046002 A1 | 7/2016 |
| | (Continued) | |

OTHER PUBLICATIONS

ISA/KR, International Search Report and Written Opinion of the International Searching Authority, International Application No. PCT/KR2019/004699, dated Jul. 24, 2019, 7 pages.

*Primary Examiner* — Stephen T. Reed

(57) ABSTRACT

An electronic device, method, and computer readable medium for high efficiency input in virtual reality and augmented reality are provided. The electronic device includes a (wired or wireless) transceiver, and a processor coupled to the transceiver. The processor receives, using the transceiver, information from at least one of a sensing element on an input element of a physical device or a tracking element on the physical device; provides, in a virtual environment and based on the information received from the at least one of the sensing element or the tracking element, a virtual device corresponding to the physical device; detects, based on the information received from the at least one of the sensing element or the tracking element, an interaction with the physical device; and provides, in association with the virtual device in the virtual environment, an indication of the interaction with the physical device.

22 Claims, 11 Drawing Sheets

(51) Int. Cl.
    *G06F 3/046*     (2006.01)
    *G02B 27/01*     (2006.01)
    *G06T 7/73*     (2017.01)
    *G06T 19/00*     (2011.01)
    *G06F 3/044*     (2006.01)

(52) U.S. Cl.
    CPC ............ *G06F 3/0346* (2013.01); *G06F 3/044* (2013.01); *G06F 3/046* (2013.01); *G06T 7/73* (2017.01); *G06T 19/006* (2013.01); *G02B 2027/014* (2013.01); *G02B 2027/0138* (2013.01)

(56) References Cited

U.S. PATENT DOCUMENTS

| | | |
|---|---|---|
| 9,946,409 B2 | 4/2018 | Ivanov |
| 2014/0002493 A1 | 1/2014 | Mitchell et al. |
| 2016/0013790 A1 | 1/2016 | Heim |
| 2017/0038830 A1 | 2/2017 | Clement et al. |
| 2017/0076502 A1 | 3/2017 | Chen et al. |
| 2017/0262045 A1* | 9/2017 | Rouvinez .............. G06T 19/006 |
| 2017/0307889 A1* | 10/2017 | Newman .............. G06F 3/03547 |
| 2017/0329515 A1 | 11/2017 | Clement et al. |
| 2018/0012412 A1 | 1/2018 | Scavezze et al. |
| 2018/0067642 A1* | 3/2018 | Stemple ................ G06F 3/0238 |
| 2018/0088682 A1 | 3/2018 | Tsang |

FOREIGN PATENT DOCUMENTS

| | | |
|---|---|---|
| KR | 10-2014-0002567 A | 1/2014 |
| KR | 1020170114298 A | 10/2017 |
| KR | 101816721 B1 | 1/2018 |

\* cited by examiner

HIGH EFFICIENCY INPUT APPARATUS AND METHOD FOR VIRTUAL REALITY AND AUGMENTED REALITY

CROSS-REFERENCE TO RELATED APPLICATION AND CLAIM OF PRIORITY

This application claims priority under 35 U.S.C. § 119(e) to U.S. Provisional Patent Application No. 62/660,150 filed on Apr. 19, 2018, titled "High Efficiency Input Technology for Virtual Reality and Augmented Reality." The above-identified provisional patent application is hereby incorporated by reference in its entirety.

TECHNICAL FIELD

This disclosure relates generally to systems for image processing. More specifically, this disclosure relates to a high efficiency input apparatus and method for virtual reality and augmented reality.

BACKGROUND

Typically, virtual reality (VR) is used in the context of a completely immersive experience. When a user enters into VR, the user is transported to a new "reality." The physical world that the user actually occupies has little or no relevance when the user is in VR. However, with augmented reality (AR), the user is present in his/her physical space, but content or information is added to augment the user's view or experience. VR is becoming mainstream for content consumption, especially for 360-degree content (i.e., 360 content). Yet, there are still many drawbacks or limitations to using VR (or AR) for productivity, such as in virtual workspaces.

SUMMARY

In one embodiment, an electronic device provides for high efficiency input in virtual reality and augmented reality. The electronic device includes a (wired or wireless) transceiver, and a processor coupled to the transceiver. The processor receives, using the transceiver, information from at least one of a sensing element on an input element of a physical device or a tracking element on the physical device; provides, in a virtual environment and based on the information received from the at least one of the sensing element or the tracking element, a virtual device corresponding to the physical device; detects, based on the information received from the at least one of the sensing element or the tracking element, an interaction with the physical device; and provides, in association with the virtual device in the virtual environment, an indication of the interaction with the physical device.

In a second embodiment, a method provides for high efficiency input in virtual and augmented reality. The method includes receiving information from at least one of a sensing element on an input element of a physical device or a tracking element on the physical device; providing, in a virtual environment and based on the information received from the at least one of the sensing element or the tracking element, a virtual device corresponding to the physical device; detecting, based on the information received from the at least one of the sensing element or the tracking element, an interaction with the physical device; and providing, in association with the virtual device in the virtual environment, an indication of the interaction with the physical device.

In a third embodiment, a non-transitory medium embodying a computer program provides for high efficiency input in virtual and augmented reality. The program code, when executed by at least one processor, causes a processor to receive, using the transceiver, information from at least one of a sensing element on an input element of a physical device or a tracking element on the physical device; provide, in a virtual environment and based on the information received from the at least one of the sensing element or the tracking element, a virtual device corresponding to the physical device; detect, based on the information received from the at least one of the sensing element or the tracking element, an interaction with the physical device; and provide, in association with the virtual device in the virtual environment, an indication of the interaction with the physical device.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
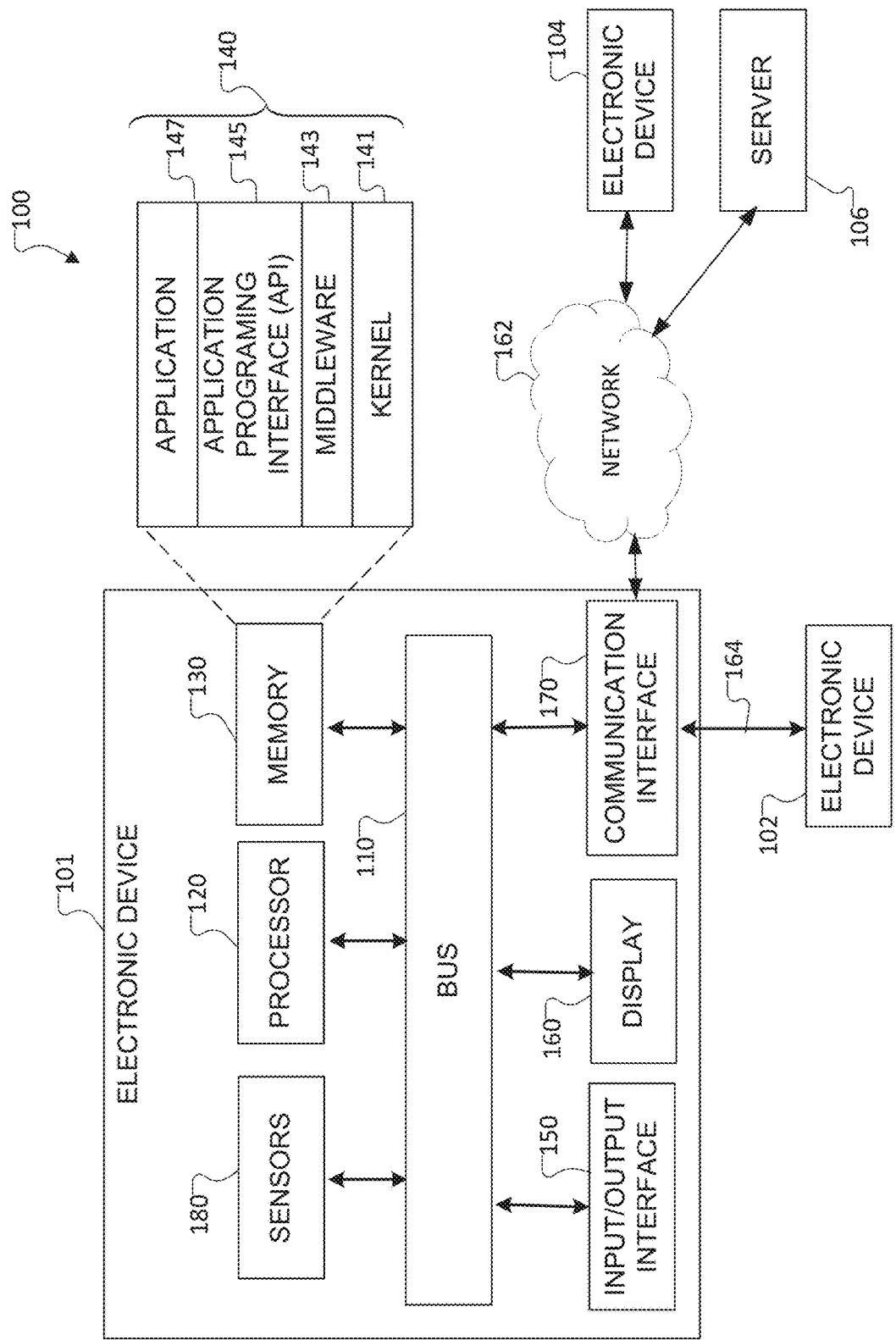
FIG. 1 illustrates an example network configuration according to embodiments of the present disclosure.

FIGS. 1 through 9, discussed below, and the various embodiments of the present disclosure are described with reference to the accompanying drawings. However, it should be appreciated that the present disclosure is not limited to the embodiments and all changes and/or equivalents or replacements thereto also belong to the scope of the present disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

One limitation of using VR or AR involves input technologies. In the physical space, conventional productivity tools and/or accessories (e.g., conventional keyboards, conventional mice, conventional trackpads) can often times be accurate and permit fast text input, such as by fitting many physical keys in a relatively small space of a physical keyboard while allowing a user to physically see the keys to input the correct text. However, conventional productivity tools and/or accessories are inefficient, inconvenient, or otherwise challenging to use in a VR or AR environment. For example, current productivity software (e.g., word processing programs, spreadsheet programs, slideshow programs, image editing software, web browsing software) is designed for 2-Dimensional (2D) interactions and is better suited for use with accurate, precise, and relatively fast input.

Moreover, current VR/AR tools and/or accessories (e.g., VR/AR remote controls, VR/AR gesture inputs) are significantly lacking with respect to performance in productivity. Current VR/AR tools and/or accessories typically allow interaction over a large area (e.g., field of view greater than 90 degrees) of a 3D space, but do so with lower accuracy/precision and mostly focus on menu selection input (rather than productivity input such as typing inputs). The current productivity tools or accessories suffer from lack of feedback in VR if there is no direct line of sight of the tool or accessory.

In certain embodiments, the disclosed technology enhances keyboard or other current input technologies to improve the accuracy and speed of inputs as well as to enable interactions and feedback for productivity scenarios in a VR/AR environment. The disclosed technology can involve hardware, software, and/or interaction technology to enable use of intuitive inputs in a VR/AR environment, such as for improving productivity.

In certain embodiments, the disclosed technology uses capacitive sensing keys for finger sensing and/or mechanical keys for detecting key inputs. In certain embodiments, the disclosed technology also uses relative positional tracking between one or more input devices and a headset or head-mounted display (HMD).

In certain embodiments, the disclosed technology can provide a sensing element on an input element of a physical human interface device (HID). A position of an appendage of a user relative to the physical HID can be detected via the sensing element. A virtual HID including a virtual input element corresponding to the input element of the physical HID can be provided in a digital or virtual environment experienced by the user. It can be determined, based on the position of the appendage relative to the physical HID, that an interaction is occurring between the appendage and the input element. An indication that the interaction is occurring can be provided in the digital environment via the virtual input element.

In certain embodiments, the interaction can include at least one of a contact interaction, a hovering interaction, or an input interaction between the appendage and the input element.

In certain embodiments, the sensing element can include at least one of an electrode sensing element, a capacitive sensing element, or an electromagnetic interference (EMI) sensing element. The position of the appendage relative to the physical HID can indicate at least one of a contact or a distance (e.g., zero distance may indicate contact) between the appendage and the input element of the physical HID.

In certain embodiments, the appendage can include a digit of a hand of a user. The digit can include a finger or a thumb.

In certain embodiments, the digital environment can be provided via a head-mounted display (HMD). A location of the physical HID relative to the HMD can be determined.

In certain embodiments, the virtual HID can be provided in the digital environment based on the location of the physical HID relative to the HMD.

In certain embodiments, one or more transceivers can be provided on the physical HID. The location of the physical HID relative to the HMD can be determined based on the one or more transceivers.

In certain embodiments, a camera (e.g., a camera of the HMD) can be implemented to provide a visualization or a displayed representation of a physical space within a virtual (or digital) environment. For example, the camera can be provided on the HMD. The camera can allow a user in a virtual environment to "see through" at least a portion of the virtual environment. In certain embodiments, the camera can be utilized for a tracking or a localization of a physical keyboard, which can provide one or more visual clues to the user in the virtual environment. In certain embodiments, the tracking or localization of the physical keyboard can enable a representation of the physical keyboard to be displayed in the virtual environment, such as being displayed to overlap a corresponding region in the virtual environment. In certain embodiments, the camera can be similarly utilized for a tracking or a localization of a physical mouse or trackpad, which can also be displayed (a representation thereof can be displayed) in the virtual environment. For instance, the location of the physical HID relative to the HMD can be determined based on object recognition technology applied to one or more images captured by the camera. Many variations are possible.

Objectives of the current application include increasing the input of text for VR, increasing the accuracy of text input in VR, providing intuitiveness for use of the tools or accessories, provide real-time feedback, providing low maintenance and minimal set-up, and maintaining compatibility with current productivity software and how people interact with computers.

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to an embodiment of the present disclosure, an electronic device 101 is included in a network environment 100. The electronic device 101 may include at least one of a bus 110, a processor 120, a memory 130, an input/output (IO) interface 150, a display 160, a communication interface 170, or sensors 180. In some embodiments, the electronic device 101 may exclude at least one of the components or may add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 may include one or more buttons for touch input, a camera, a gesture sensor, a gyroscope or gyro sensor, an air pressure sensor, a magnetic sensor or magnetometer, an acceleration sensor or accelerometer, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 may be located within the electronic device 101. A camera sensor 180 can capture a plurality of frames for a single image to be combined by the processor 120.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (Wi-Bro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or server 106 via the network 162, the electronic device 101 may be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2A:
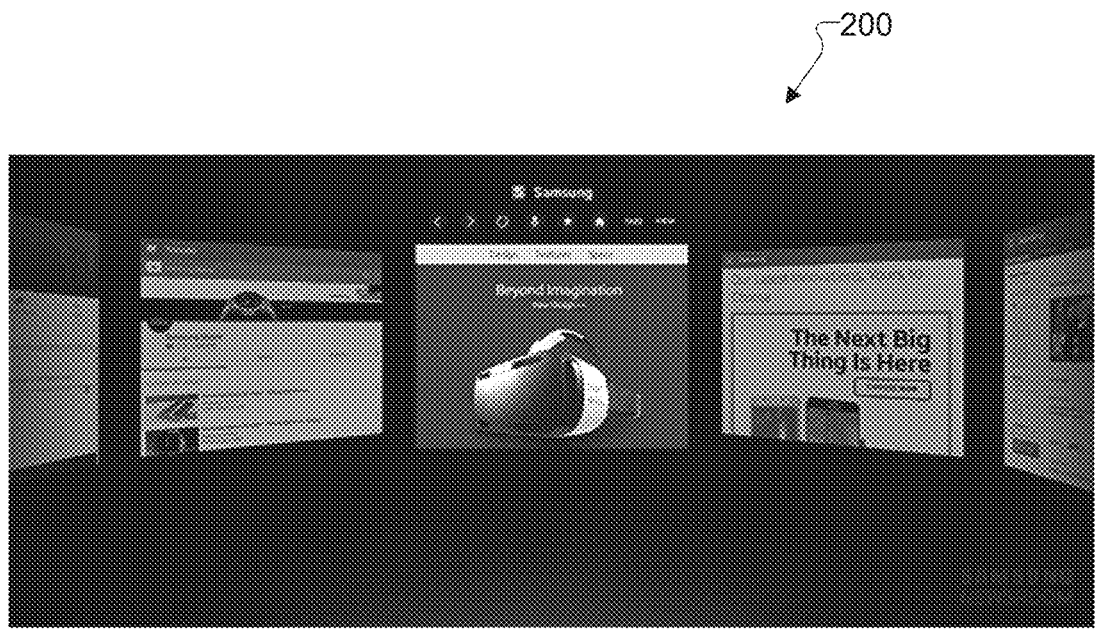
FIG. 2A illustrates an example of a virtual environment according to embodiments of the present disclosure.
Figure 2B:
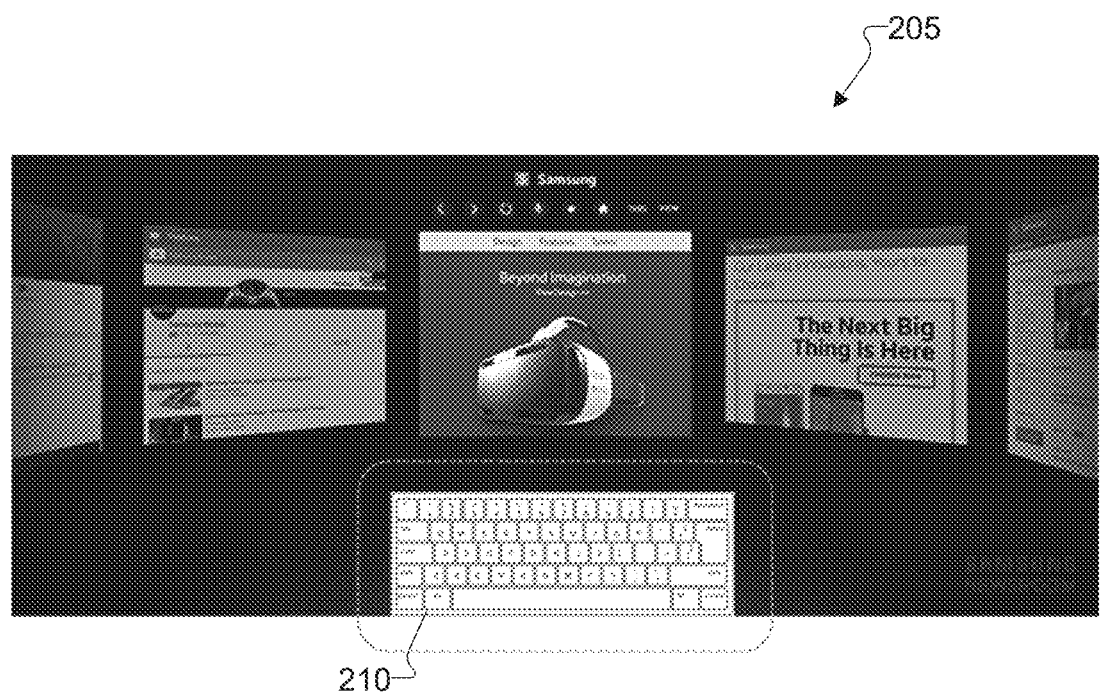
FIG. 2B illustrates an example of an enhanced virtual environment with an virtual input device according to embodiments of the present disclosure.

FIG. 2A illustrates an example of a virtual environment 200 according to embodiments of the present disclosure. FIG. 2B illustrates an example of an enhanced virtual environment 205 with a virtual input device 210 according to embodiments of the present disclosure. The embodiments of the virtual environment 200 shown in FIG. 2A and the enhanced virtual environment 205 shown in FIG. 2B are for illustration only. Other embodiments of the virtual environment and the enhanced virtual environment could be used without departing from the scope of this disclosure.

The virtual environment 200 provides a VR experience to a user. An input beyond selecting an item in the virtual 200 can be troublesome and difficult to manage. The enhanced virtual environment 205 includes a virtual input device 210. The virtual input device 210 corresponds to a physical input device in the vicinity of the user.

The enhanced virtual environment 205 is beneficial for VR or AR productivity to be utilized with accurate, precise, and fast input. The enhanced virtual environment 205 provides fast input text for VR, high accuracy and precision, real-time feedback (e.g., visual feedback), and compatibility with current productivity software and/or tools. In some embodiments, no extra setup needed (e.g., external position tracking), etc.

Figure 3A:
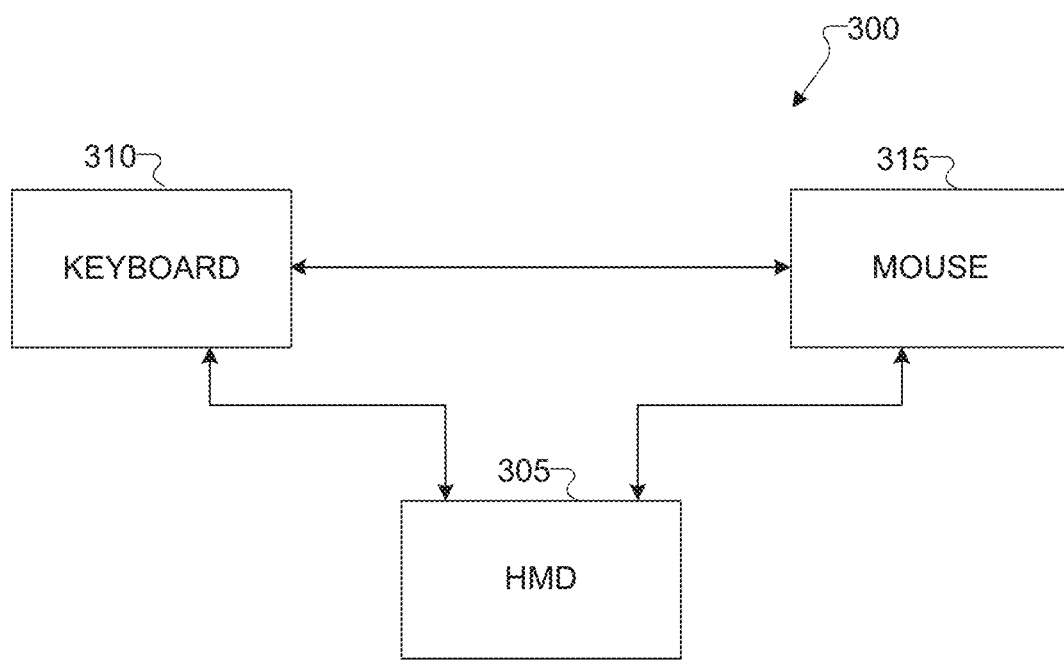
FIG. 3A illustrates an example connectivity of VR physical devices according to embodiments of the present disclosure.
Figure 3B:
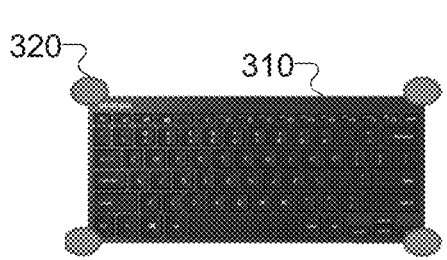
FIGS. 3B, 3C, 3D, 3E, 3F, 3G, 3H and 3I illustrate example VR physical devices according to embodiments of the present disclosure.
Figure 3C:
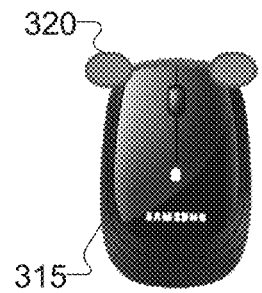
Figure 3D:
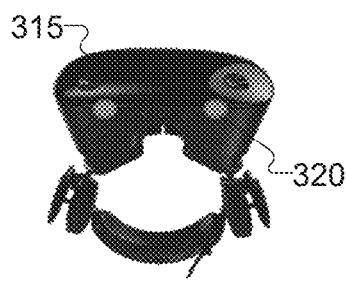
Figure 3E:
Figure 3H:
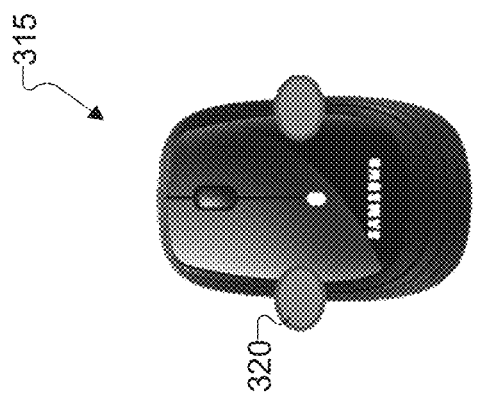
Figure 3I:
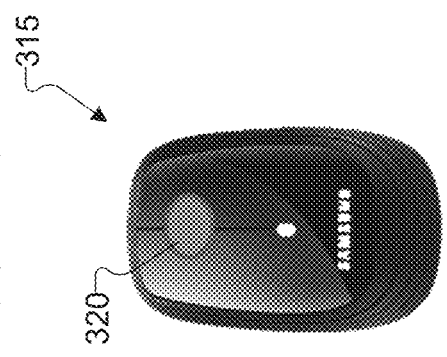
Figure 3F:
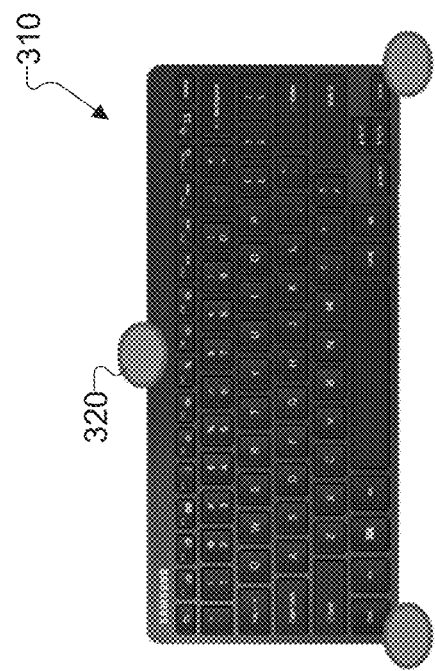
Figure 3G:
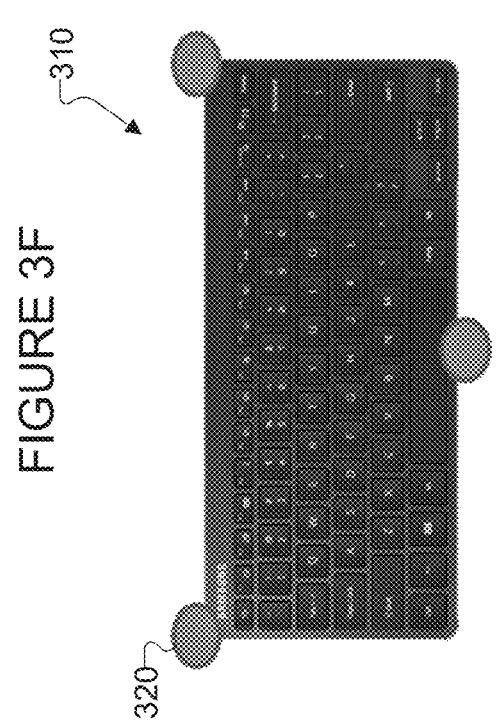

FIG. 3A illustrates an example connectivity 300 of VR physical devices 310, 315, 320 according to embodiments of the present disclosure. FIGS. 3B-3I illustrate example VR physical devices 310, 315, 320 according to embodiments of the present disclosure. For example, FIG. 3B illustrates an example VR physical keyboard 310 according to embodiments of the present disclosure. FIG. 3C illustrates an example VR physical mouse 315 according to embodiments of the present disclosure. FIGS. 3D and 3E illustrate an example VR headset 315 according to embodiments of the present disclosure. FIGS. 3F and 3G illustrate example VR keyboards 315 with alternate locations for one or more transceivers 320 according to embodiments of the present disclosure. FIGS. 3D and 3E illustrate an example VR headset 315 according to embodiments of the present disclosure. The embodiments of the connectivity 300 and VR physical devices 305, 315 and 315 shown in FIGS. 3A-3E are for illustration only. Other embodiments of the VR connectivity and VR physical devices could be used without departing from the scope of this disclosure.

Figure 9:
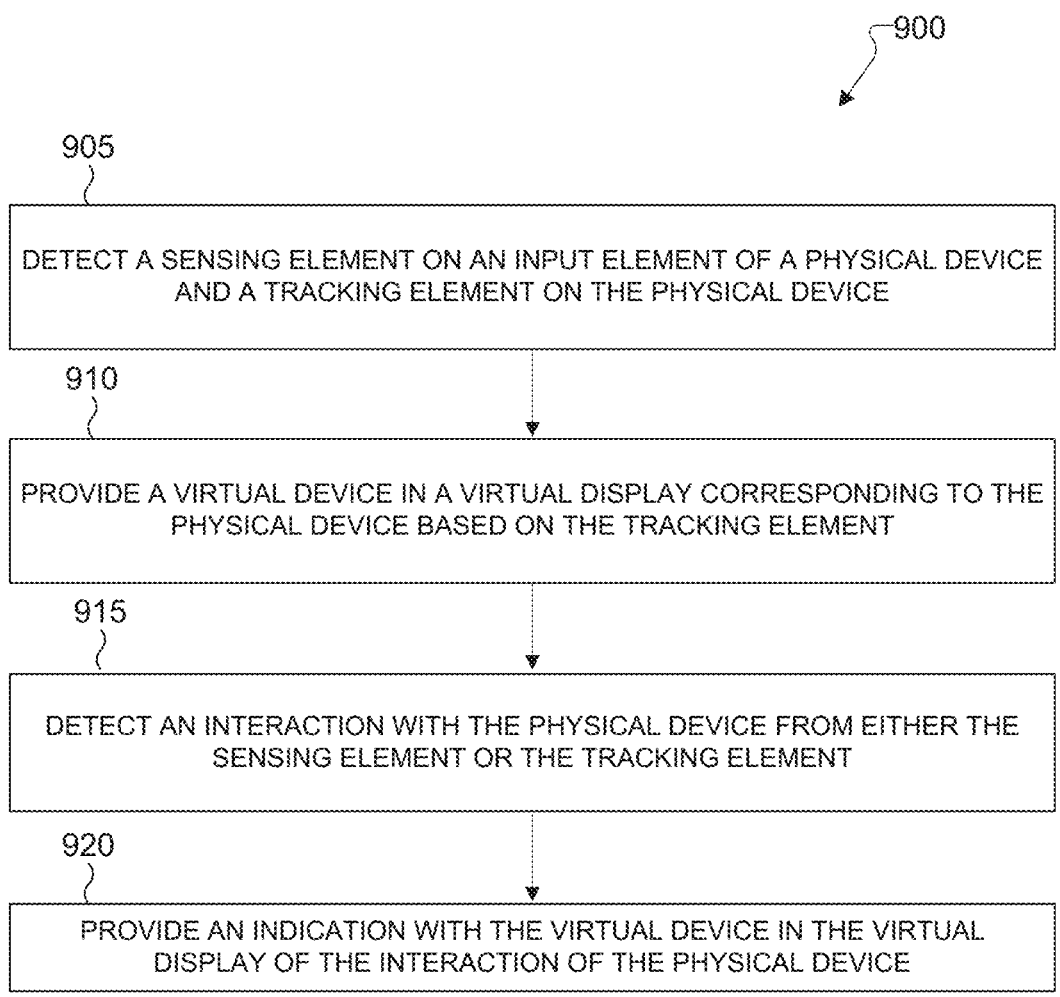
FIG. 9 illustrates an exemplary process flow diagram showing a method for high efficiency input in virtual reality and augmented reality according to embodiments of the present disclosure.

Examples of input devices 310, 315 operating with an HMD 305 are provided in FIGS. 3A-3I. As discussed, the input devices include a keyboard 310, a mouse 315, and an HMD 305, but any input devices can be interchange with, removed, or added to the system. Other examples of input devices include, but are not limited to, a tablet, a wearable device, a mobile device, and the like. The different input devices 305, 310, 315 can be connected by wire or wirelessly. Additional devices could be added for operating the method of FIG. 9, including a processor 101 shown in FIG. 1, a tablet, mobile device, etc. In certain embodiments, the method of FIG. 9 is performed by a processor 101 located in the HMD 305.

In some embodiments, one or more physical input devices include at least one tracking element 320. The tracking element could be, for example, one or more transceivers. The tracking elements 320 can be located at various locations on the physical input devices 305, 310, 315. For example, the keyboard 310 includes four tracking elements 320 located at the corners in FIG. 3B, three tracking elements 320 located at two corners and at the center of an opposite side in FIGS. 3F and 3G. In certain embodiments, a single tracking element 320 can be used, e.g., on the mouse 315 in FIG. 3I.

The tracking elements 320 can be used to determine the type, size, location, and orientation of the physical input device 305, 310, 315. For example, the tracking element(s) 320 could send information to the processor 101 regarding the type, size, location, and orientation determined at the physical input device 305, 310, 315. In other embodiments, the processor 101 determines each of the type, size, location, and orientation based on the tracking elements 320. For example, the size can be determined based on the distances determined between each tracking element 320 and the orientation can be determined based on the location of the tracking elements 320 and the determined type of physical input device 305, 310, 315.

In some embodiments, the digital environment can be provided via a head-mounted display (HMD), such as a VR headset, AR glasses, smart glass, etc., worn by the user. A location of the physical device relative to the HMD can be determined. In some cases, the virtual device can be provided in the digital environment based on the location of the physical device relative to the HMD. For example, when the location of the physical device relative to the HMD changes, the location of the virtual device in the virtual environment can change accordingly.

In some embodiments, one or more transceivers can be provided on the physical device. The location of the physical device relative to the HMD can be determined based on the one or more transceivers.

In some embodiments, a camera can be provided on the HMD, and the location of the physical device relative to the HMD can be determined based on the camera, such as by applying object recognition technology to one or more images captured by the camera to identify the physical device.

In certain embodiments, one or more transceivers (e.g., transmitters, receivers) configured to detect one or more relative positions are included. Examples of such transceivers can include, but are not limited to, ultrasound transmitters and/or receivers.

Figure 4A:
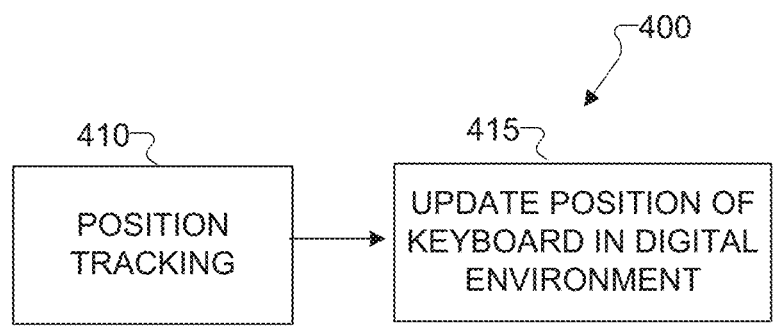
FIGS. 4A and 4B illustrate an example location tracking of the VR physical device in the virtual environment according to embodiments of the present disclosure.
Figure 4B:
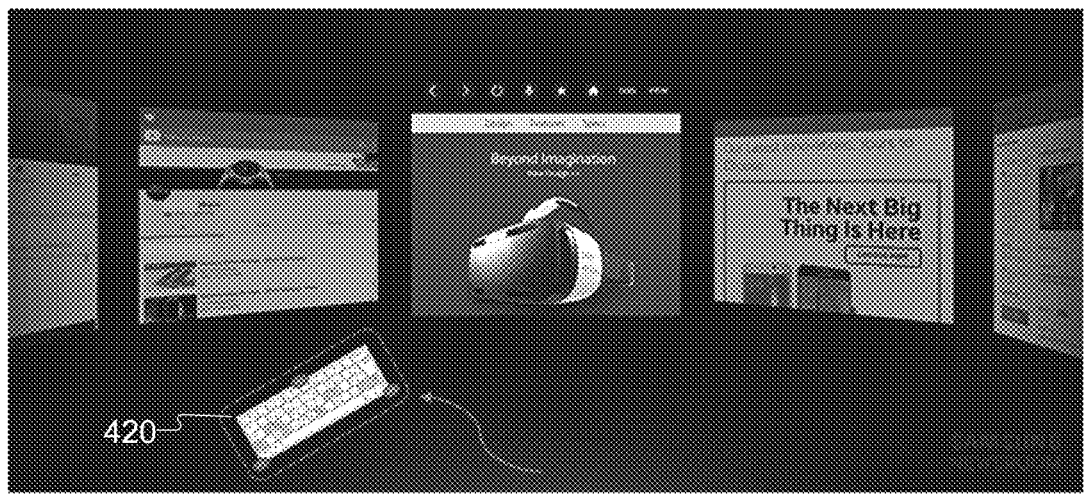

FIG. 4A illustrates an example of location tracking 400 of a VR physical device (e.g., device 310, 315, or 320) according to embodiments of the present disclosure. FIG. 4B illustrates an example of location tracking 400 of a virtual input device 420 in an enhanced virtual environment 405 according to embodiments of the present disclosure. The embodiments of the location tracking 400 and the enhanced virtual environment 405 shown in FIGS. 4A and 4B are for illustration only. Other embodiments of the location tracking and enhanced virtual environment could be used without departing from the scope of this disclosure.

In operation 410, the processor 101 performs location tracking 400 on the physical input devices, such as device 310 and/or 315. The location tracking 400 provides extended functionality for AR/VR physical device location and orientation. In other words, location tracking 400 provides an enhanced ability for locating a physical device in the real world by identifying the position and orientation of the physical device with a virtual representation of the device in the virtual environment at a corresponding location and orientation. The location tracking 400 can be based on the tracking elements of the physical device. The positions of the physical input devices 310, 315 are tracked relative to an HMD 305.

In operation 415, the processor 101 performs an update on the position of the physical input devices 310, 315 in the virtual environment 405. The location and/or orientation of the virtual input device 420 correspond to the relative location and/or orientation of the physical input device 310. As the physical input device 310 is moved around, the virtual input device 420 is similarly adjusted in the enhanced virtual environment 405.

Figure 5A:
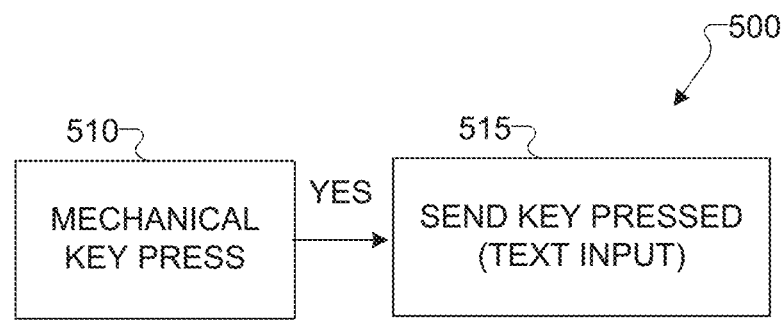
FIGS. 5A, 5B, 5C, and 5D illustrate an example finger sensing of the VR physical device in the virtual environment according to embodiments of the present disclosure.
Figure 5B:
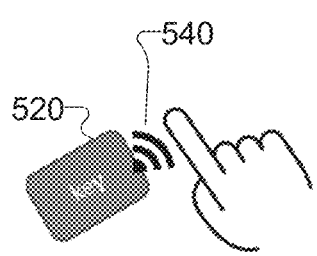
Figure 5C:
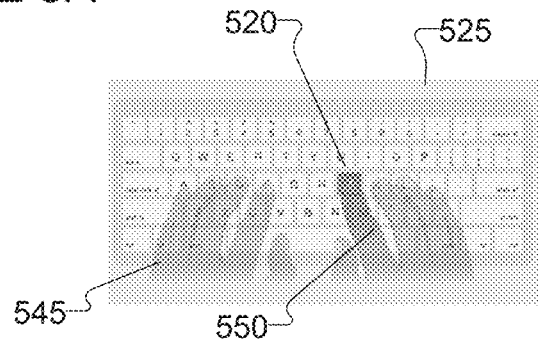
Figure 5D:
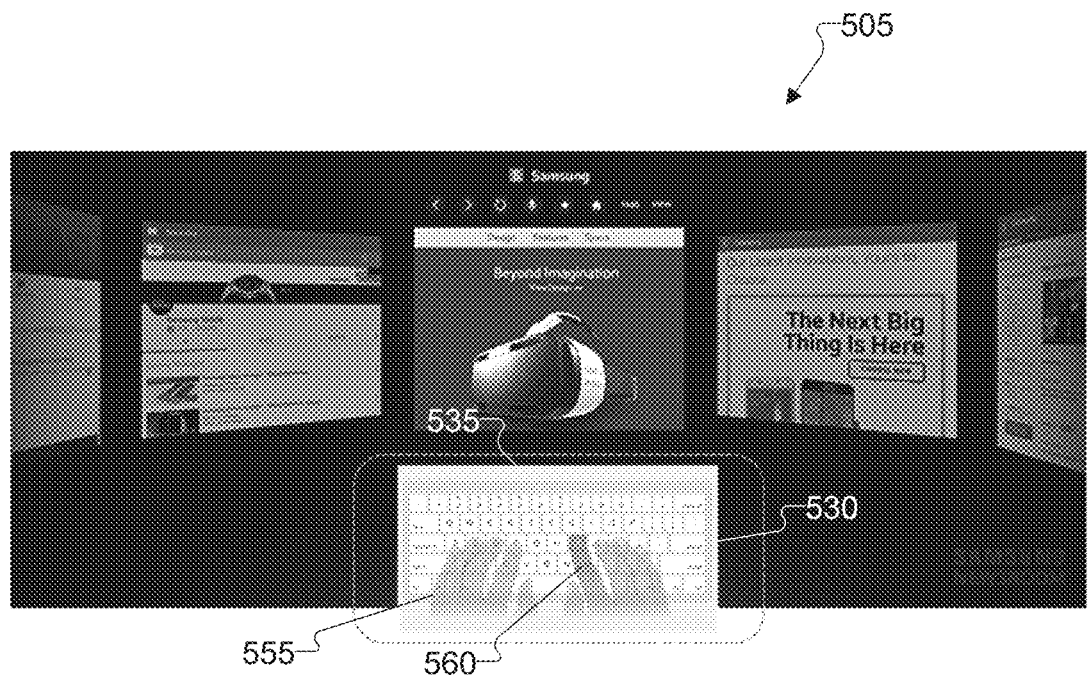

FIG. 5A illustrates an example of finger sensing 500 on a VR physical device 310, 315, 320 according to embodiments of the present disclosure. FIG. 5B illustrates an example of a pressing of a physical key 520 according to embodiments of the present disclosure. FIG. 5C illustrates an example of a pressing of a physical key 520 on a physical keyboard 525 according to embodiments of the present disclosure. FIG. 5D illustrates an example of displaying a virtual key input 535 on a virtual input device 530 in an enhanced virtual environment 505 indicating the finger sensing 500 of the physical key 520 according to embodiments of the present disclosure. The embodiments of the finger sensing 500 and the enhanced virtual environment 505 shown in FIGS. 5A-5D are for illustration only. Other embodiments of the finger sensing and enhanced virtual environment could be used without departing from the scope of this disclosure.

In operation 510, the processor 101 detects an interaction with an input element 520 of the physical input device 525. The interaction can include activating an input element 520, contact with input element 520, hovering over the input element 520, etc.

In operation 520, the processor 101 displays an indication of the interaction on the virtual input element 535 of the virtual input device 530 in the virtual environment 505 corresponding to the input element 520 of the physical input device 525. The indication can include displaying a marker on the virtual input element 535. The marker can be a highlighting or altering the darkness of a specific appendage used to interact with the specific input element 520. For example, when a physical mouse 315 is "left-clicked," a marker is placed on the left virtual input element 535. According to the example shown in FIG. 5D, a marker has been placed on the virtual input element 535 that would correspond to the letter "j" on a keyboard. This means processor 101 detected an appendage of the user on the input element 520 on the physical input device 525 (keyboard) corresponding to the letter "j".

In certain embodiments, a virtual (or digital) device 530 including a virtual input element 535 corresponding to the input element 520 of the physical device 525 can be provided in the enhanced virtual environment 505 experienced by the user. In some implementations, the virtual device 530 can be a representation of the physical device 525 and the virtual device 530 can be displayed in the virtual environment 505. An interaction 540 occurring between the appendage and the input element 520 can be determined based on the position of the appendage relative to the physical device 525. For example, the interaction 540 can include at least one of a contact interaction (e.g., touching a key on a keyboard, touching a button on a mouse, etc.), a hovering interaction (e.g., hovering over a key on a keyboard, hovering over a button on a mouse, etc.), or an input interaction (e.g., typing a key on a keyboard, clicking a button on a mouse, etc.) between the appendage and the input element 520. An indication that the interaction 540 is occurring can be provided in the enhanced virtual environment 505 via the virtual input element 535. In some cases, the indication can include a highlighting or a marking of the virtual input element 535 in the virtual environment 505.

In certain embodiments, the information received based on the interaction of the physical hand 545 or physical appendage 550 with the physical keyboard 525 is used to display a VR hand 555 or VR appendage 560 in the virtual environment 505. The processor 101 can use the information received to determine the position of each physical appendage 550 detected and predict an orientation of the physical hand 545. Based on the positions and orientation, the processor can display the corresponding VR appendages 560 and VR hands 555 in the virtual environment 505.

Figure 6A:
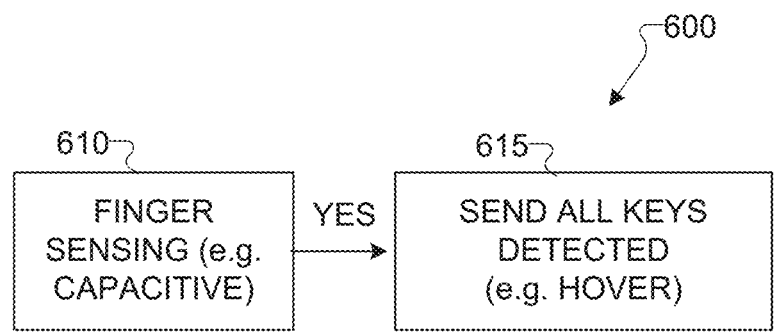
FIGS. 6A, 6B, and 6C illustrate an example multiple finger sensing of the VR physical device in the virtual environment according to embodiments of the present disclosure.
Figure 6B:
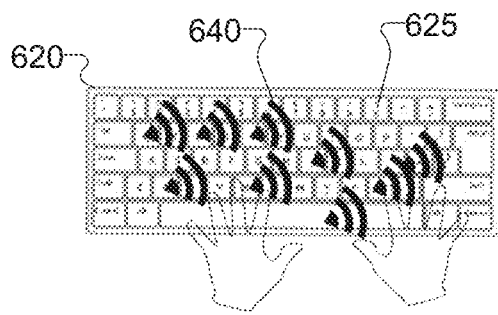
Figure 6C:

FIG. 6A illustrates an example of multiple finger sensing 600 on a VR physical device 310, 315, 320 according to embodiments of the present disclosure. FIG. 6B illustrates an example of multiple pressings of physical keys 620 on a physical keyboard 625 according to embodiments of the present disclosure. FIG. 6C illustrates an example of displaying multiple virtual key inputs 635 on a virtual input device 630 in an enhanced virtual environment 605 indicating the multiple finger sensing 600 of the physical keys 620 according to embodiments of the present disclosure. The embodiments of the multiple finger sensing 600 and the enhanced virtual environment 605 shown in FIGS. 6A-6C are for illustration only. Other embodiments of the multiple finger sensing and enhanced virtual environment could be used without departing from the scope of this disclosure.

In operation 610, the processor 101 detects multiple interactions 640 on different input elements 625 on the physical input device 620. Each of the input elements 625 can be provided with an individual sensing element that can detect the multiple interactions 640.

In operation 615, the processor 101 displays multiple indications or markers on each of the virtual input elements 635 on the virtual input device 630 in the enhanced virtual environment 605 corresponding to the different input elements 625 interacted with on the physical input device 620.

In certain embodiments, the multiple interactions 640 or the interaction 540 could be used for detecting specific motion for gesture detection over the physical device. For example, the interaction 540 could be a hover that moves in a specific manner across the surface of a specific sensing element or across multiple sensing elements. The interaction could include detecting a pattern of hovering and contacts. The interaction could include detecting an amount of time of the interaction or between successive interactions.

The gestures could correspond to specific functions of the system, including accessing different applications, controlling the viewing orientation of the virtual environment, selecting an object in the virtual environment, etc. Examples of gestures could include a swipe motion, left motion, right motion, top motion, bottom motion, up motion, down motion, circle motion, etc.

Figure 7A:
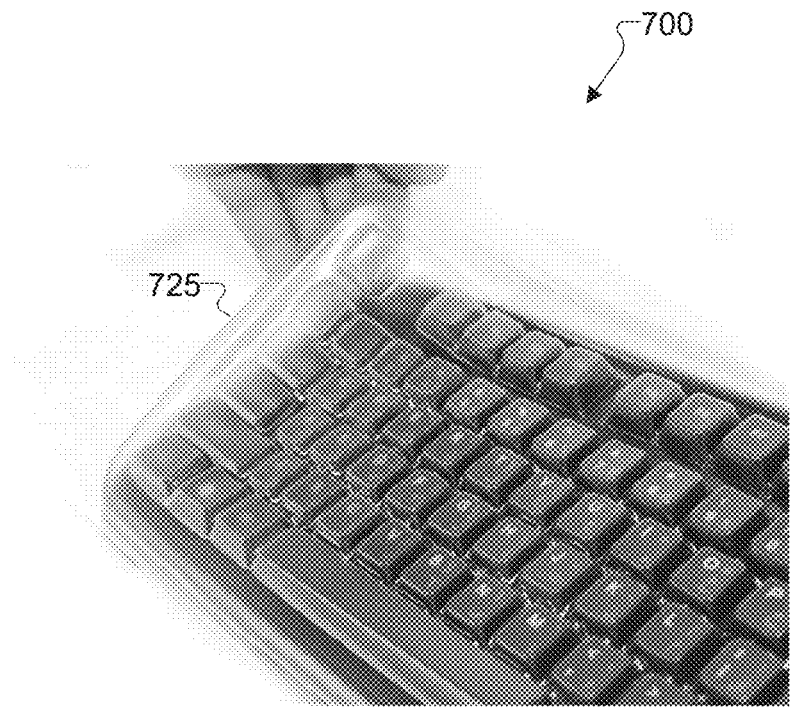
FIG. 7A illustrates an example sensory cover configured to be operable with a non-VR physical input device according to embodiments of the present disclosure.
Figure 7B:
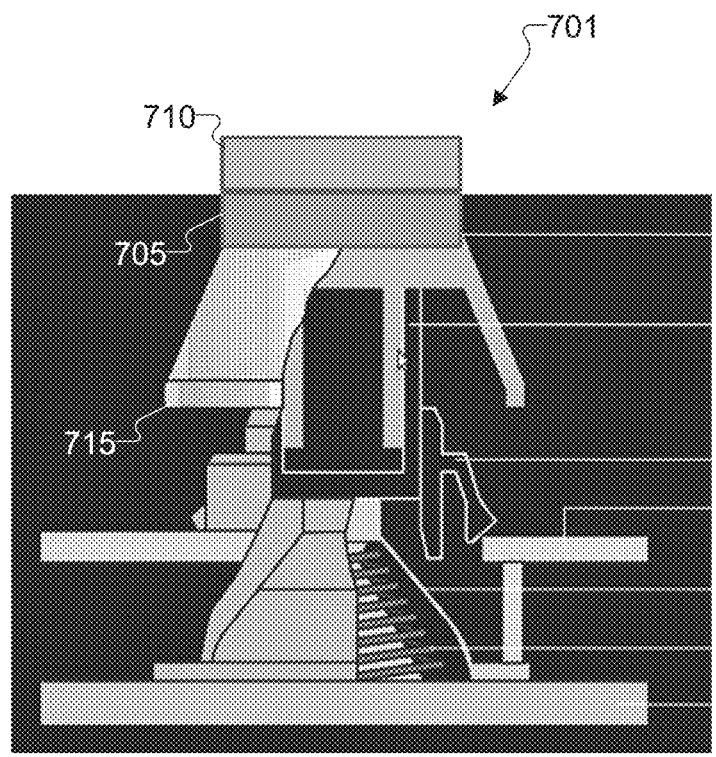
FIGS. 7B and 7C illustrate example sensing elements for implementing in a VR physical device according to embodiments of the present disclosure.
Figure 7C:
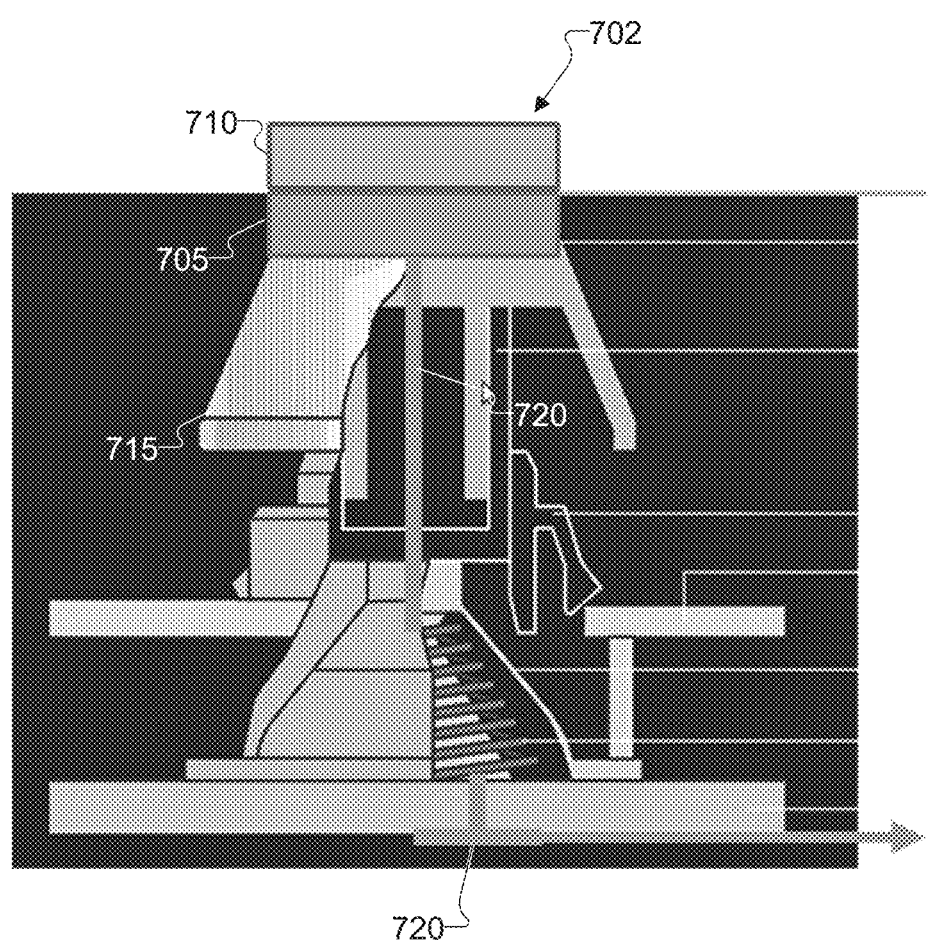

FIG. 7A illustrates an example of finger sensing 700 on a non-VR physical device using a VR sensory cover 725 according to embodiments of the present disclosure. In the example of FIG. 7A, various features, components, and/or embodiments of the present disclosure, such as sensing elements (e.g., 701, 702, 705, and/or 710, etc.) and/or tracking elements (e.g., 320), can be implemented within the VR sensory cover 725. When the VR sensory cover 725 is covering over and operating in conjunction with the non-VR physical device, the combination of the VR sensory cover 725 and the non-VR physical device effectively operates as a VR physical device of the present disclosure. FIG. 7B illustrates an example of the sensing element 701 configured to be operable with a physical input element (e.g., a physical key of a physical keyboard) 715 according to embodiments of the present disclosure. FIG. 7C illustrates an example of the sensing element 702 configured to be operable with the physical input 715. FIG. 7C further illustrates conductive materials 720 according to embodiments of the present disclosure. The embodiments shown in FIGS. 7A, 7B, and 7C are for illustration only. Other embodiments could be used without departing from the scope of this disclosure.

In some embodiments, a sensing element 701 can be provided on an input element 715 (e.g., mechanical key or button) of a physical device, such as a physical keyboard, mouse, keypad, etc. The sensing element 701 can, for example, include at least one of an electrode sensing element 705, an isolator element 710, a capacitive sensing element, or an electromagnetic interference (EMI) sensing element. In some embodiments, the capacitive sensing element can include the electrode sensing element 705 and/or the isolator element 710. In some embodiments, the EMI sensing element can include the electrode sensing element 705 and/or the isolator element 710. A position of an appendage of a user relative to the physical device can be detected via the sensing element 701. The position of the appendage relative to the physical device can, for instance, indicate at least one of a contact or a distance (e.g., zero distance may indicate contact) between the appendage and the input element 715 of the physical device. As an example, the appendage can include a digit of a hand of a user, and the digit can include a finger or a thumb. The contact or distance can be determined based on changes in signal strength and/or waveform data (e.g., capacitance, EMI signals, etc.) received from the electrode of the sensing element 705.

For example, the electrode sensing element 705 can use a small voltage applied to a coating on the input (i.e., input element) to detect a change in capacitance across the input. The change in capacitance allows the processor 101 determine the location of the touch. Other examples could include conductor interference or radiated interference, which detect a "disturbance" or interference from a hand or appendage that is contacting or hovering over the sensing element.

The conductive materials 720 could be used to transmit a sensing signal to an electronics block or to processor 101. A radio frequency can be used by the sensing element including an electrode or antenna for detection of an appendage. The detection of the appendage could include contact detection, radar detection, or capacitance detection. In other embodiments, light can be used by the sensing elements, including LEDs, photodiodes, and time of flight sensors. The number of light sensing elements would not need to correspond with a one-to-one ratio with the input elements.

In certain embodiments, a combination of the different types of sensing elements could be used. For example, the physical device could include a combination of different transceivers, for example, an LED/photodiode and antennas or electrodes. The edges could use the LED/photodiode to extend a range of both the sensing and the tracking.

Figure 8A:
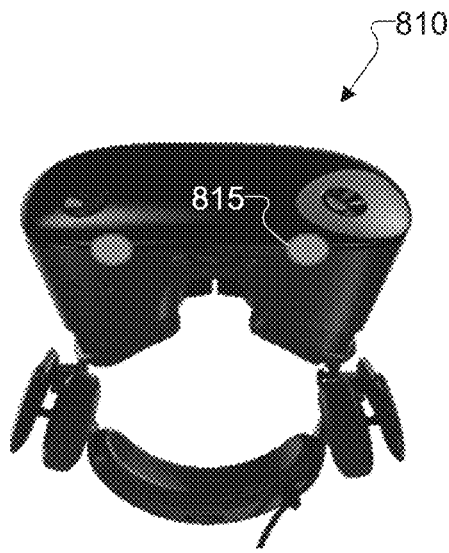
FIGS. 8A, 8B, and 8C illustrate an example physical device for see-through sensing according to embodiments of the present disclosure.
Figure 8B:
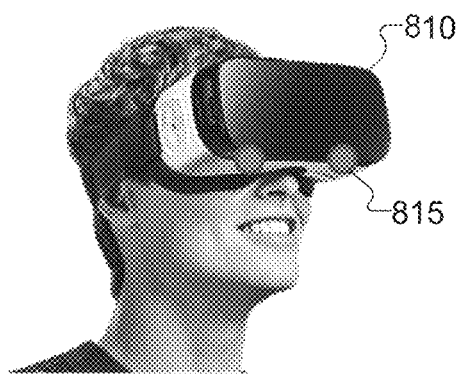
Figure 8C:
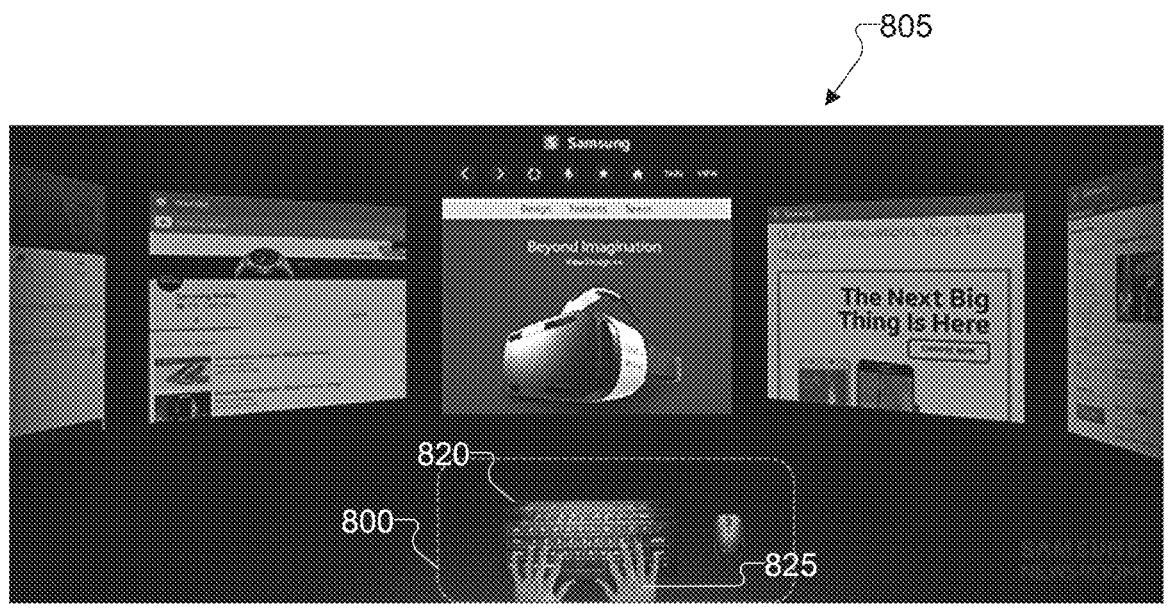

FIGS. 8A and 8B illustrate examples of a VR physical device 810 with at least one camera 815 for see-through sensing 800 according to embodiments of the present disclosure. FIG. 8C illustrates an example of see-through sensing 800 in an enhanced virtual environment 805 according to embodiments of the present disclosure. The embodiments of the VR physical device 810 and enhanced virtual environment 805 for see-through sensing 800 shown in FIGS. 8A-8C are for illustration only. Other embodiments could be used without departing from the scope of this disclosure.

See-through sensing 800 is a procedure where the processor 101 detects the physical device 820 and the hand 825 using a camera on the HMD 810 and displays the physical device (e.g., keyboard) 820 and hand 825 in the virtual environment 805 corresponding to the captured physical device 820 and hand 825.

In certain embodiments, an HMD 810 can include at least one camera 815. The location of the physical device 820 relative to the HMD 810 can be determined based on object recognition technology applied to one more images captured by the camera 815. The images can be used with the object recognition technology to detect the physical device 820 and the hands 825 in the captured image or images (e.g., a video stream). The image (or video) of the physical device 820 and the hands 825 are overlaid in the virtual environment 805. This procedure allows the user to detect and view the physical device 820 and hand 825 in a manner similar to detecting and viewing the physical device 820 and hand 825 in the real world or without the HMD 810.

FIG. 9 illustrates an exemplar flow diagram 900 a method for high efficiency input in virtual and augmented reality according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 9 can be performed by the electronic device 101 in FIG. 1.

In operation 905, the electronic device 101 receives information from at least one of a sensing element on an input element of a physical device or a tracking element on the physical device. The electronic device can determine at least one of a type or a size of the physical device based on the tracking element on the physical device. The sensing element includes at least one of an electrode sensing element, a capacitive sensing element, or an electromagnetic interference (EMI) sensing element. The tracking element can include a plurality of transceivers on the physical device.

In operation 910, the electronic device 101 provides, in a virtual environment and based on the information received from at least one of the sensing element or the tracking element, a virtual device corresponding to the physical device. The virtual device can be provided in the virtual environment based on at least one of the type or the size of the physical device. The virtual environment can be provided on an HMD. The electronic device 101 can determine, based on information received from the tracking element a physical location and an orientation of the physical device relative to the HMD using the tracking element. The electronic device 101 can control at least one of a virtual location or a virtual orientation of the virtual device in the virtual environment based on the at least one of the physical location or the physical orientation of the physical device. When the HMD includes a camera, at least one of the physical location or the physical orientation of the physical device relative to the HMD is determined based on object recognition technology applied to one or more images captured by the camera.

In operation 915, the electronic device 101 detects, based on the information received from at least one of the sensing element or the tracking element, an interaction with the physical device. When an interaction with the physical device is detected based on the information received from the sensing element, the interaction indicates a location of an appendage of a user in relation to the input element of the physical device.

In operation 920, the electronic device 101 provides, in association with the virtual device in the virtual environment, an indication of the interaction with the physical device. The indication can be a marker provide in relation to a virtual input element on the virtual device corresponding to the input element of the physical device. When the interaction with the physical device is detected based on information received from the sensing element, the indication provides a virtual appendage in relation to a virtual input element on the virtual device. A virtual contact or a virtual distance between the virtual appendage and the virtual input element corresponds to a contact or a distance between an appendage of a user and the input element of the physical device. When the interaction with the physical device is detected based on information received from the tracking element, the indication is an adjustment of at least one of the virtual location or the virtual orientation of the virtual device corresponding to the at least one of the physical location or the physical orientation of the physical device.

Although FIG. 9 illustrates an example process, various changes could be made to FIG. 9. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
    a transceiver; and
    a processor coupled to the transceiver, the processor configured to:
        receive, using the transceiver, information from a sensing element on an input element of a physical device and a tracking element on the physical device;
        provide, in a virtual environment and based on the information received from the at least one of the sensing element or the tracking element, a virtual device corresponding to the physical device;
        detect, based on the information received from the at least one of the sensing element or the tracking element, an interaction of an appendage with the physical device;
        determine a location of the appendage in relation to the physical device;
        provide, in the virtual environment, a virtual appendage in relation to the virtual device corresponding to the appendage in relation to the physical device; and
        provide, in association with the virtual device in the virtual environment, an indication for the interaction of a portion of the appendage with the physical device, wherein the indication includes a marker provided on a virtual input element on the virtual device and at least one of a highlighting of the portion or a change to a darkness of the portion of the virtual appendage corresponding to the input element of the physical device.

2. The electronic device of claim 1, wherein:
    the processor is further configured to determine at least one of a type or a size of the physical device based on the tracking element on the physical device, and the virtual device is provided in the virtual environment based on the at least one of the type or the size of the physical device.

3. The electronic device of claim 1, wherein the interaction of the appendage with the physical device is detected based on information from the sensing element.

4. The electronic device of claim 1, wherein:
the sensing element includes at least one of an electrode sensing element, a capacitive sensing element, or an electromagnetic interference (EMI) sensing element; and
when the interaction with the physical device is detected based on information received from the sensing element, a virtual contact or a virtual distance between the virtual appendage and the virtual input element correspond to a contact or a distance between the appendage of a user and the input element of the physical device.

5. The electronic device of claim 1, wherein the processor is further configured to:
provide the virtual environment via a head-mounted display (HMD);
determine, based on information received from the tracking element, at least one of a physical location or a physical orientation of the physical device relative to the HMD; and
control at least one of a virtual location or a virtual orientation of the virtual device in the virtual environment based on the at least one of the physical location or the physical orientation of the physical device.

6. The electronic device of claim 5, wherein, when the interaction with the physical device is detected based on information received from the tracking element, the indication includes an adjustment of the at least one of the virtual location or the virtual orientation of the virtual device corresponding to the at least one of the physical location or the physical orientation of the physical device.

7. The electronic device of claim 5, wherein:
the tracking element includes a set of one or more transceivers on the physical device, and
at least one of the physical location or the physical orientation of the physical device relative to the HMD is determined based on the set of one or more transceivers.

8. The electronic device of claim 5, wherein:
the HMD includes a camera, and
at least one of the physical location or the physical orientation of the physical device relative to the HMD is determined based on object recognition technology applied to one or more images captured by the camera.

9. The electronic device of claim 1, wherein the processor is further configured to:
detect, based on information received from the sensing element, a gesture over the physical device from at least one of a hand or the appendage of a user;
determine a function corresponding to the gesture; and
performing the function in the virtual environment.

10. The electronic device of claim 1, wherein the processor is further configured to:
detect, based on information received from the sensing element, at least one of a physical location or a physical orientation of at least one of a hand or appendage in relation to the physical device; and
display at least one of a virtual hand or the virtual appendage in the virtual environment corresponding to the at least one of the physical location or the physical orientation of the hand or appendage.

11. A method, the method comprising:
receive information from at least one of a sensing element on an input element of a physical device or a tracking element on the physical device;
providing, in a virtual environment and based on the information received from the at least one of the sensing element or the tracking element, a virtual device corresponding to the physical device;
detecting, based on the information received from the at least one of the sensing element or the tracking element, an interaction of an appendage with the physical device;
determining a location of the appendage in relation to the physical device;
providing, in the virtual environment, a virtual appendage in relation to the virtual device corresponding to the appendage in relation to the physical device; and
providing, in association with the virtual device in the virtual environment, an indication for the interaction of a portion of the appendage with the physical device, wherein the indication includes a marker provided on a virtual input element on the virtual device and at least one of a highlighting of the portion or a change to a darkness of the portion of the virtual appendage of the virtual appendage corresponding to the input element of the physical device.

12. The method of claim 11, further comprising:
determining at least one of a type or a size of the physical device based on the tracking element on the physical device,
wherein the virtual device is provided in the virtual environment based on the at least one of the type and the size of the physical device.

13. The method of claim 11, wherein the interaction of the appendage with the physical device is detected based on information from the sensing element.

14. The method of claim 11, wherein:
the sensing element includes at least one of an electrode sensing element, a capacitive sensing element, or an electromagnetic interference (EMI) sensing element; and
when the interaction with the physical device is detected based on information received from the sensing element, a virtual contact or a virtual distance between the virtual appendage and the virtual input element correspond to a contact or a distance between the appendage of a user and the input element of the physical device.

15. The method of claim 11, further comprising:
providing the virtual environment via a head-mounted display (HMD);
determining, based on information received from the tracking element, at least one of a physical location or a physical orientation of the physical device relative to the HMD; and
controlling at least one of a virtual location or a virtual orientation of the virtual device in the virtual environment based on the at least one of the physical location or the physical orientation of the physical device.

16. The method of claim 15, wherein, when the interaction with the physical device is detected based on the information received from the tracking element, the indication includes an adjustment of the at least one of the virtual location or the virtual orientation of the virtual device corresponding to the at least one of the physical location or the physical orientation of on the physical device.

17. The method of claim 15, wherein:
the tracking element includes a set of one or more transceivers on the physical device, and at least one of the physical location or the physical orientation of the physical device relative to the HMD is determined based on the set of the one or more transceivers.

18. The method of claim 15, wherein:

the HMD includes a camera, and at least one of the physical location or the physical orientation of the physical device relative to the HMD is determined based on object recognition technology applied to one or more images captured by the camera.

19. A non-transitory computer readable medium embodying a computer program, the computer program comprising computer readable program code that when executed causes at least one processor to:

receive information from at least one of a sensing element on an input element of a physical device or a tracking element on the physical device;

provide, in a virtual environment and based on the information received from the at least one of the sensing element or the tracking element a virtual device corresponding to the physical device;

detect, based on the information received from the at least one of the sensing element or the tracking element, an interaction of an appendage with the physical device;

determine a location of the appendage in relation to the physical device;

provide, in the virtual environment, a virtual appendage in relation to the virtual device corresponding to the appendage in relation to the physical device; and provide, in association with the virtual device in the virtual environment, an indication for the interaction of a portion of the appendage with the physical device, wherein the indication includes a marker provided on a virtual input element on the virtual device and at least one of a highlighting of the portion or a change to a darkness of the portion of the virtual appendage of the virtual appendage corresponding to the input element of the physical device.

20. The non-transitory computer readable medium of claim 19, wherein the interaction of the appendage with the physical device is detected based on information from the sensing element.

21. The non-transitory computer readable medium of claim 19, wherein the processor is further configured to:

provide the virtual environment via a head-mounted display (HMD);

determine, based on information received from the tracking element, at least one of a physical location and physical orientation of the physical device relative to the HMD; and control at least one of a virtual location or a virtual orientation of the virtual device in the virtual environment based on the at least one of the physical location or the physical orientation of the physical device.

22. The non-transitory computer readable medium of claim 21, wherein, when the interaction with the physical device is detected based on information received from the tracking element, the indication includes an adjustment of the at least one of the virtual location or the virtual orientation of the virtual device corresponding to the at least one of the physical location or the physical orientation of the physical device.

* * * * *